(12) United States Patent
Granek et al.

(10) Patent No.: US 12,051,241 B2
(45) Date of Patent: Jul. 30, 2024

(54) SENSOR SYSTEMS AND METHODS FOR FACILITY OPERATION MANAGEMENT

(71) Applicant: Xtract One Technologies Inc., Toronto (CA)

(72) Inventors: Justin Samuel Granek, Vancouver (CA); Elliot Mark Holtham, Vancouver (CA)

(73) Assignee: Xtract One Technologies Inc.

( * ) Notice: Subject to any disclaimer, the term of this patent is extended or adjusted under 35 U.S.C. 154(b) by 323 days.

(21) Appl. No.: 17/330,971

(22) Filed: May 26, 2021

(65) Prior Publication Data

US 2022/0148310 A1 May 12, 2022

Related U.S. Application Data

(60) Provisional application No. 63/029,983, filed on May 26, 2020.

(51) Int. Cl.
*G06V 20/40* (2022.01)
*G06N 3/045* (2023.01)
*G06V 20/52* (2022.01)
*G06V 40/10* (2022.01)

(52) U.S. Cl.
CPC .......... *G06V 20/41* (2022.01); *G06N 3/045* (2023.01); *G06V 20/52* (2022.01); *G06V 40/103* (2022.01)

(58) Field of Classification Search
None
See application file for complete search history.

(56) References Cited

U.S. PATENT DOCUMENTS

| 9,406,212 | B2* | 8/2016 | De Luca | G06V 40/20 |
| 2014/0032596 | A1* | 1/2014 | Fish | G09B 7/00 |
| | | | | 707/770 |
| 2020/0138292 | A1* | 5/2020 | Choi | A61B 5/091 |
| 2020/0253683 | A1* | 8/2020 | Amanatullah | A61B 90/06 |
| 2021/0025605 | A1* | 1/2021 | Bullister | F24F 13/28 |

(Continued)

OTHER PUBLICATIONS

Gao, Naiping, Jianlei Niu, and Lidia Morawska. "Distribution of respiratory droplets in enclosed environments under different air distribution methods." Building simulation. vol. 1. Springer Berlin Heidelberg, 2008. (Year: 2008).*

(Continued)

*Primary Examiner* — Michelle M Entezari Hausmann

(57) ABSTRACT

Aspects relate to systems and methods for the application of computer vision and sensor fusion to assist in the management and operation of a facility. For large facilities, many of the expenses and staffing requirements incurred such as energy, custodial duties, maintenance and security can scale with size rather than usage, and therefore be subject to gross inefficiencies. These challenges may arise from a lack of timely information available with which to make such optimizations and improvements. The approaches disclosed leverage recent advancements in computer vision technology to extract actionable information from raw sensor data collected through-out the facility. This information may be processed and applied in either an autonomous, semi-autonomous, or user driven approach to control and manage a number of processes occurring regularly within a facility, such as lighting, cleaning, and security.

6 Claims, 16 Drawing Sheets

(56) References Cited

U.S. PATENT DOCUMENTS

2021/0150874 A1* 5/2021 Turano ............... H04L 12/2809
2022/0138347 A1* 5/2022 Mcdonagh ........... A61B 5/7275
                                                        705/2

OTHER PUBLICATIONS

Dygert, Ryan K., and Thong Q. Dang. "Mitigation of cross-contamination in an aircraft cabin via localized exhaust." Building and Environment 45.9 (2010): 2015-2026. (Year: 2010).*

Anand, S., and Y. S. Mayya. "Size distribution of virus laden droplets from expiratory ejecta of infected subjects." Scientific reports 10.1 (2020): 21174. (Year: 2020).*

Dey, Prasenjit, Sandip K. Saha, and Sandip Sarkar. "Study of the interactions of sneezing droplets with particulate matter in a polluted environment." Physics of Fluids 33.11 (2021). (Year: 2021).*

Calles, A., and J. L. Moran-López. "Modeling the viral load expelled in saliva droplets carrying SARS-COV-2." Journal of Physics Communications 5.9 (2021): 095005. (Year: 2021).*

Kumar, Sunil, et al. "Dispersion of sneeze droplets in a meat facility indoor environment-Without partitions." Environmental Research 236 (2023): 116603. (Year: 2023).*

* cited by examiner

SENSOR SYSTEMS AND METHODS FOR FACILITY OPERATION MANAGEMENT

CROSS REFERENCE TO RELATED APPLICATIONS

The application claims priority to and the benefit of U.S. Provisional Patent Application Ser. No. 63/029,983, entitled "SENSOR SYSTEMS AND METHODS FOR FACILITY OPERATION MANAGEMENT", filed on May 26, 2020, the disclosure of which is incorporated herein by reference in its entirety.

BACKGROUND

The present disclosure relates to machine learning. More particularly, the present disclosure is in the technical field of computer vision for video content understanding. More particularly, the present disclosure is in the field of computer vision and sensor fusion to assist in management and operations of a facility using video and sensor data.

The topic of computer vision has received significant attention over the last several years because of the impressive accuracy the technology has demonstrated on a number of tasks, such as correctly identifying the main subject in an image. Computer vision is a subset of machine learning focused on techniques and algorithms which relate to visual inputs such as images and videos. Computer vision tasks include but are not limited to image classification, object recognition, scene segmentation, and video understanding. In accomplishing these tasks a computer vision algorithm takes as input an image, series of images, or a video sequence, and outputs annotations such as one or many classes, bounding boxes for detected entities within the inputs, or labels to describe or interpret the activity or objects in a video sequence.

Operation and management of a facility can be a very labor-intensive task. Particularly for large public facilities, many of the expenses and staffing requirements incurred such as energy, custodial duties, maintenance and security can scale with size rather than usage, and therefore be subject to gross inefficiencies. These challenges may arise from a lack of timely information available with which to make such optimizations and improvements. Such information may be difficult or expensive to acquire in a large facility using traditional staffing solutions, due to the number of individuals required to monitor the facility. Furthermore, even utilization of modern video surveillance solutions may not provide the desired information, but rather massive quantities of raw video data, from which it may not be immediately obvious how to extract the most valuable information.

SUMMARY

It is desirable to utilize information from a video monitoring service and other remote data collection sensors throughout a facility to inform decisions related to operation and management. Additionally, it is desirable to apply computer vision and data fusion technology to automate the monitoring of multiple sensor sources within or surrounding a facility. It may also be desirable for such technology to automatically process live video and sensor sources to extract relevant information to present to a user.

A system and associated methods are disclosed to monitor video and sensor sources in a facility and deliver actionable information to an end user to assist in its operation and management. This system and methods may assist in the optimization and efficiency of resources deployed for the purpose of managing and operating the facility as well as improve safety and security of the staff and visitors. The information provided by the system may be used interactively or autonomously (or semi-autonomously) to control processes throughout the facility. For certain applications, the information from the system can be directly or automatically applied to control certain processes within the facility, such as the lighting in a room depending on its occupancy, without requiring user interaction. For other processes, the information from the system can be delivered to the user in a digital interface via a series of interactive alerts, commands and controls, such as notifications of which areas in a facility are displaying heavier use, and therefore potentially require cleaning more promptly or thoroughly than others. In another mode, the information can be used off-line to provide analytics about key performance metrics of the facility.

DETAILED DESCRIPTION

Figure 1:
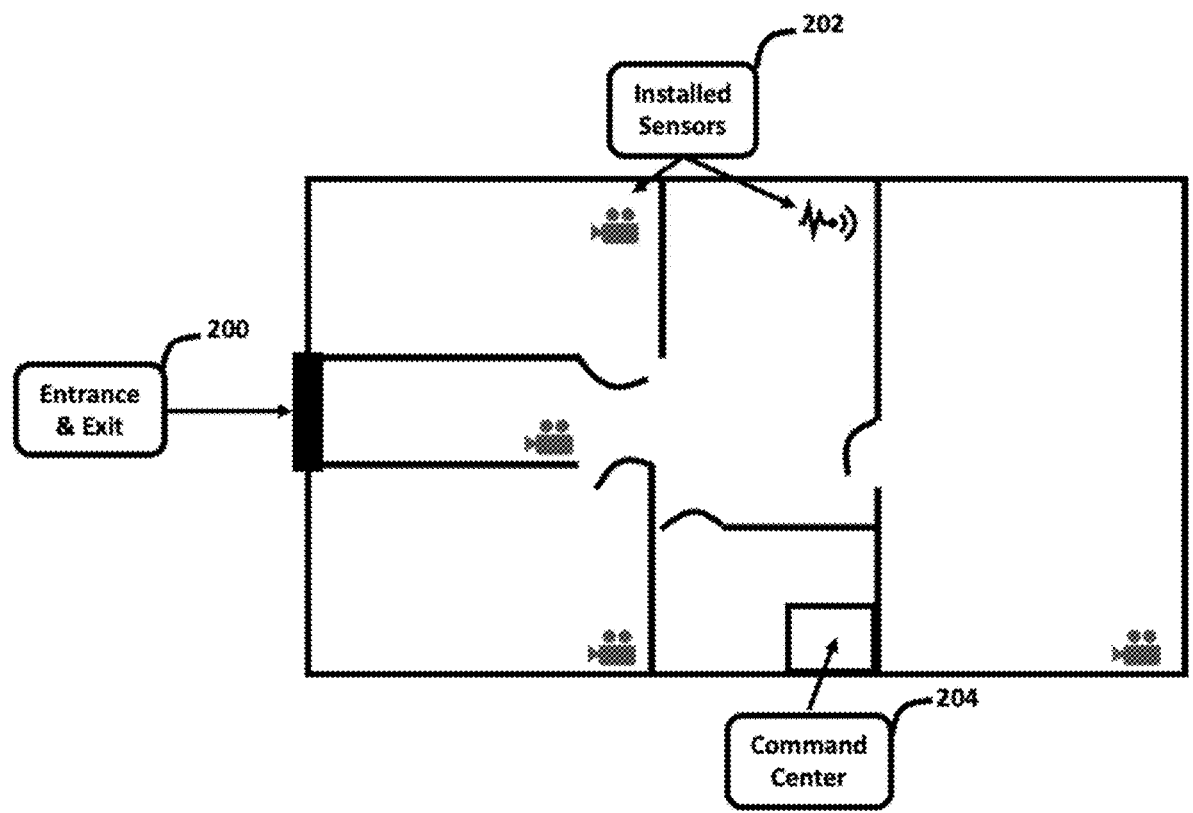
FIG. 1 depicts a schematic of the system as it might be deployed within a facility. It is composed of a sensor network through-out the facility, and a command center.

FIG. 1 depicts a schematic of the system as it might be deployed within a facility. It is composed of a sensor network through-out the facility, and a command center. The system described herein consists of a network of sensors (e.g. video cameras) deployed throughout a facility (block 202) including an entrance and exit (block 200), with a central command station (block 204) to acquire and process the data collected from the sensors (the central command station could be on premise, or remote or deployed in the cloud). The information obtained from the processing may be routed from the command station to various control stations through-out the facility, where it may interact either with a user or an autonomous control process, such as lighting control.

The data collected by the system may consist of live video feeds from multiple sources, or other sensor data from sensors such as optical sensors to detect people crossing certain zones, acoustic or sound pressure sensors to detect sonic presences or signatures, olfactory sensors to detect certain scents or particulates, or any other sensors. The data from these sensors may be collected at numerous locations through-out the facility and routed via ethernet cable, Wi-Fi®, Bluetooth®, or other connectivity to a command center where the data can be processed by various algorithms, including convolutional neural networks, a particular architecture of artificial neural network suited to visual tasks. The command center need not be a singular physical node, but can also be a number of nodes to aid in redundancy and fault tolerance.

Figure 2:
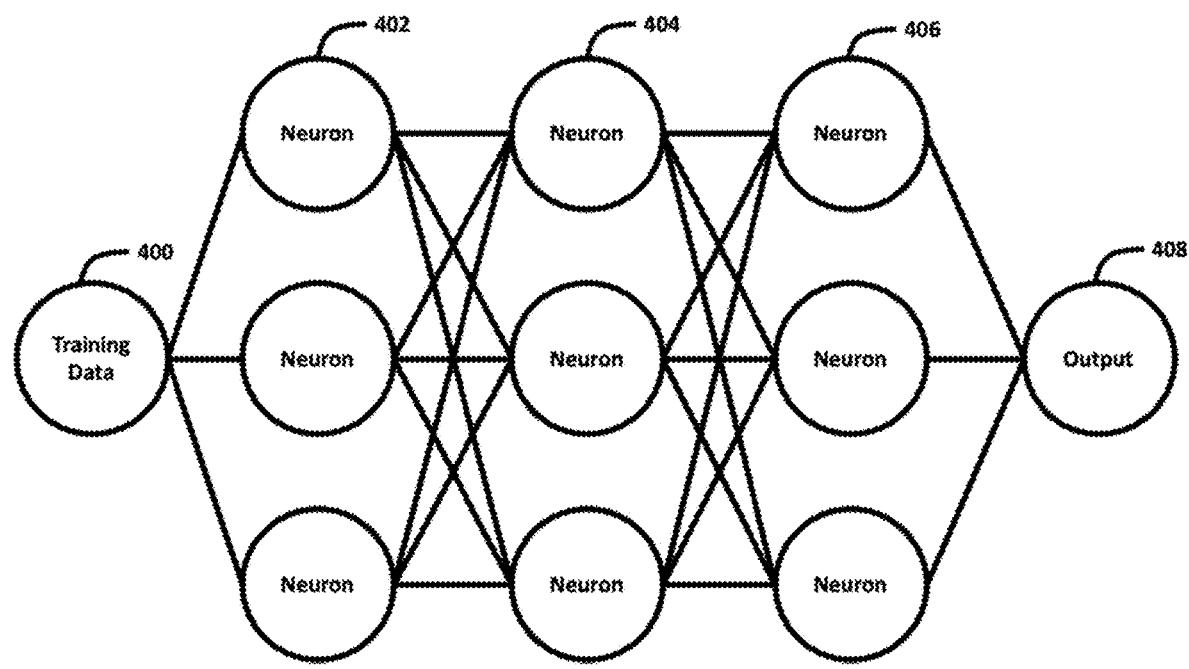
FIG. 2 depicts the architecture of a typical neural network.

Artificial neural networks are used to model complex relationships between inputs and outputs or to find patterns in data, where the dependency between the inputs and the outputs cannot be easily ascertained. FIG. 2 depicts the architecture of a typical neural network. Training data is fed to a number of neurons, structured into layers, which feed forward until finally returning an output. A neural network typically includes an input layer (block 400), one or more intermediate ("hidden") layers (block 404), and an output layer (block 408), with each layer including a number of nodes. The number of nodes can vary between layers.

A neural network is considered "deep" when it includes two or more hidden layers. The nodes in each layer connect to some or all nodes in the subsequent layer, and the weights of these connections are typically learned from data during the training process, for example through backpropagation in which the network parameters are tuned to produce expected outputs given corresponding inputs in labeled training data.

Figure 3:
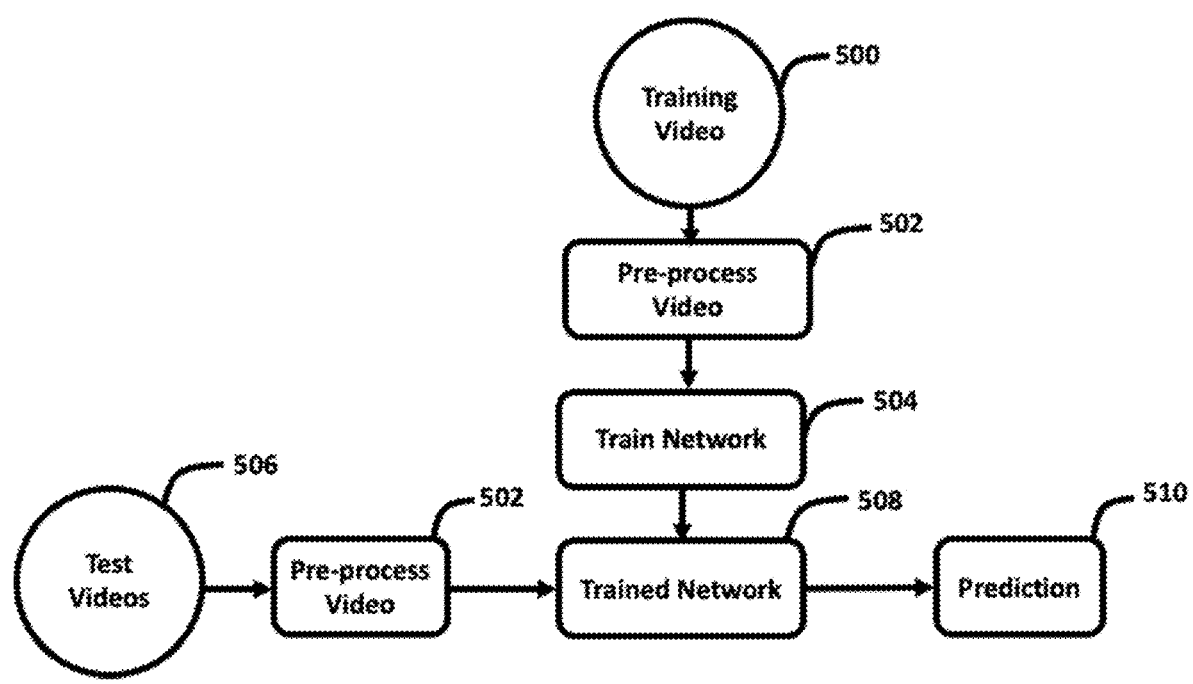
FIG. 3 depicts the manner in which a neural network is trained and then deployed on new test data to generate predictions.

FIG. 3 depicts the manner in which a neural network is trained and then deployed on new test data to generate predictions. In FIG. 3, during training, an artificial neural network can be exposed to pairs in its training data and can modify its parameters to be able to predict the output of a pair when provided with the input. Thus, an artificial neural network is an adaptive system that is configured to change its structure (e.g. The connection configuration and/or weights) based on information that flows through the network during training, and the weights of the hidden layers can be considered as an encoding of meaningful patterns in the data.

A convolutional neural network ("CNN") is a type of artificial neural network that is commonly used for visual tasks, such as image analysis. Like the artificial neural network described above, a CNN is made up of nodes and has learnable weights. However, the nodes of a layer are only locally connected to a small region of the width and height layer before it (e.g. a 3×3 or 5×5 neighborhood of image pixels), called a receptive field. The hidden layer weights can take the form of a convolutional filter applied to the receptive field. In some implementations, the layers of a CNN can have nodes arranged in three dimensions: width, height, and depth. This corresponds to the array of pixel values in each image (e.g. the width and height) and to the number of images in a sequence or stack (e.g. the depth).

Figure 4:
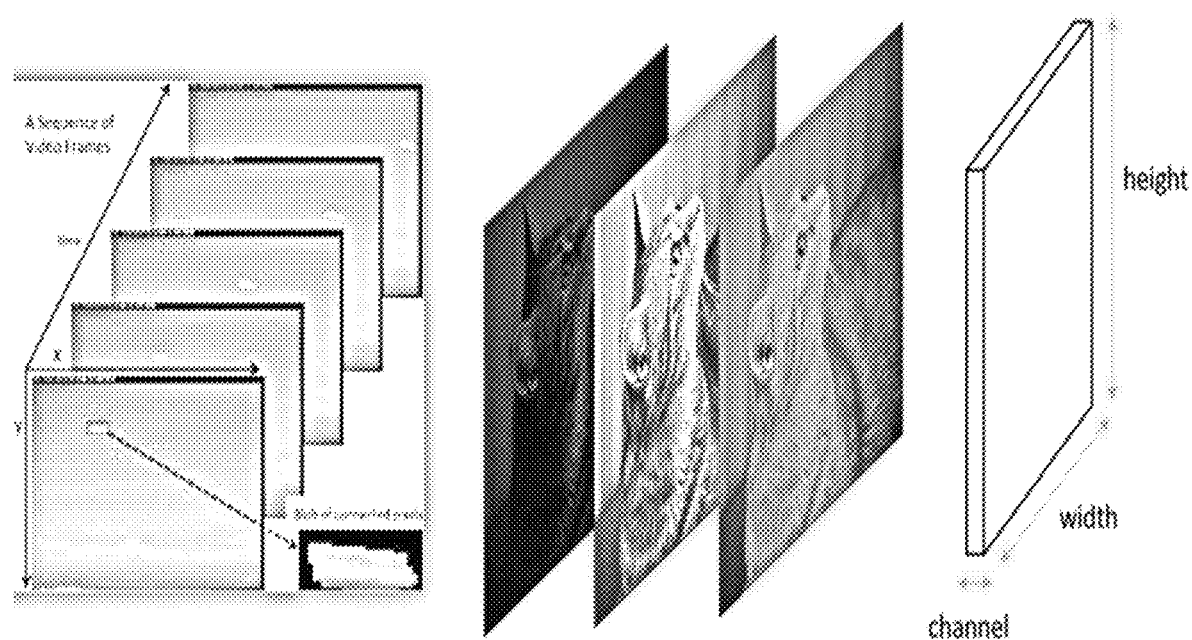
FIG. 4 depicts a typical structure of input data for computer vision applications. On the left, a sequence of video frames, and on the right the three RGB channels of a color image.

As shown in FIG. 4, a sequence can be a video, for example, while a stack can be a number of different channels (e.g. red, green, and blue channels of an image, or channels generated by a number of convolutional filters applied in a previous layer of the neural network). The nodes in each convolutional layer of a CNN can share weights such that the convolutional filter of a given layer is replicated across the entire width and height of the input volume (e.g. across an entire frame), reducing the overall number of trainable weights and increasing applicability of the CNN to data sets outside of the training data—known as generalization. Values of a layer may be pooled to reduce the number of computations in a subsequent layer (e.g. values representing certain pixels, such as the maximum value within the receptive field, may be passed forward while others are discarded). Further along the depth of the CNN pool masks may reintroduce any discarded values to return the number of data points to the previous size. A number of layers, optionally with some being fully connected, can be stacked to form the CNN architecture. References herein to neural networks performing convolutions and/or pooling can be implemented as CNNs.

Figure 5:
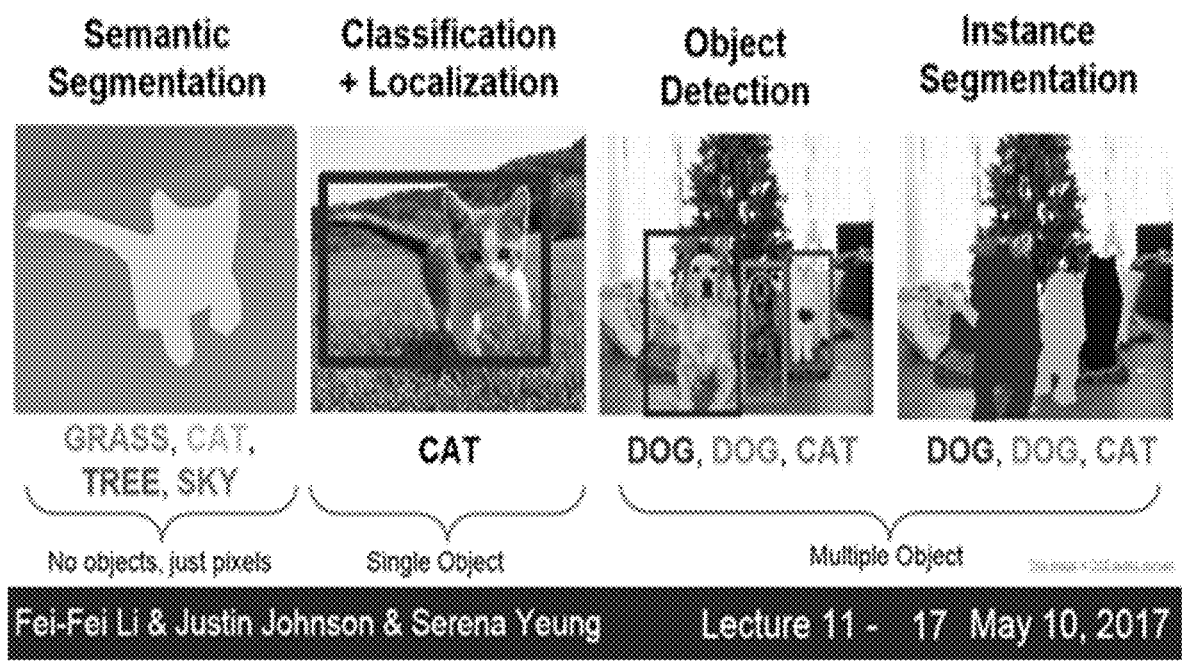
FIG. 5 depicts a selection of the possible tasks completed by computer vision algorithms: semantic segmentation, classification and localization, object detection and instance segmentation.

Numerous advancements in neural network technologies have resulted in specialization of various CNN architectures for particular tasks, such as object detection, scene segmentation, and action recognition. FIG. 5 depicts a selection of the possible tasks completed by computer vision algorithms: semantic segmentation, classification and localization, object detection and instance segmentation. Networks for each task may contain different types of connections between layers, different numbers of layers, different receptive field sizes, and/or different output layers, among many other possible differences. For example, the output from a classification network will often be a vector, where each value corresponds to a probability for each different object class (e.g. ["cat", "dog", "horse", . . . , "car"]), whereas the output of a scene segmentation network may be an image of the same size (e.g. same width and height) as the input images, but wherein each pixel value is an integer corresponding to a predicted class (e.g. this pixel in the image is predicted to be "sky", whereas another pixel may be predicted to be "man", and another may be predicted as "road").

Beyond simply specializing for different output styles (e.g. predicting a single class for the image, versus predicting a class for each pixel in the image), many CNN architectures have also specialized for different expected operating modes. For example, for object detection tasks, one important operating criterion may be the speed of the algorithm (e.g. how many frames can be processed per second). This requirement is often balanced against the accuracy of the method, resulting in a number of different architectures such as Faster-RCNN and YOLOv3, each with their own strengths and weaknesses.

Figure 6:
FIG. 6 depicts a small sampling of two different well-known datasets used for computer vision applications, along with their respective label annotations: on the left, CIFAR10, and on the right MS-COCO.

Complementary to the array of different CNN architectures which have been developed over the last decade, there also exists an array of associated benchmark datasets, often with a particular task in mind (e.g. ImageNet is a database of over a million images with associated labels for a single entity/noun in the frame; it has been used as a benchmark for image classification networks for a number of years). For an example, FIG. 6 depicts a small sampling of two different well-known datasets used for computer vision applications, along with their respective label annotations: on the left, CIFAR10, and on the right MS-COCO.

Though the number of different architectures and datasets is large, and growing constantly, the reader should understand that current state of the art for tasks such as object detection (e.g. identify if a particular object occurs in the frame and locate it) are average precisions of over 40% and speeds over 45 frames per second (e.g. YOLOv3 architecture). For reference, naïve guessing would render an accuracy of under 2% (e.g. for the MS-COCO dataset, 80 possible object classes: 1/80=1.25%), and many videos are recorded at 30 frames per second.

For the purposes of the proposed system, various CNNs may be employed to process the video streams from through-out a facility in order to obtain actionable information 612 which can be applied to assist in the management and operation of the facility, either in an automated or interactive manner.

Figure 7:
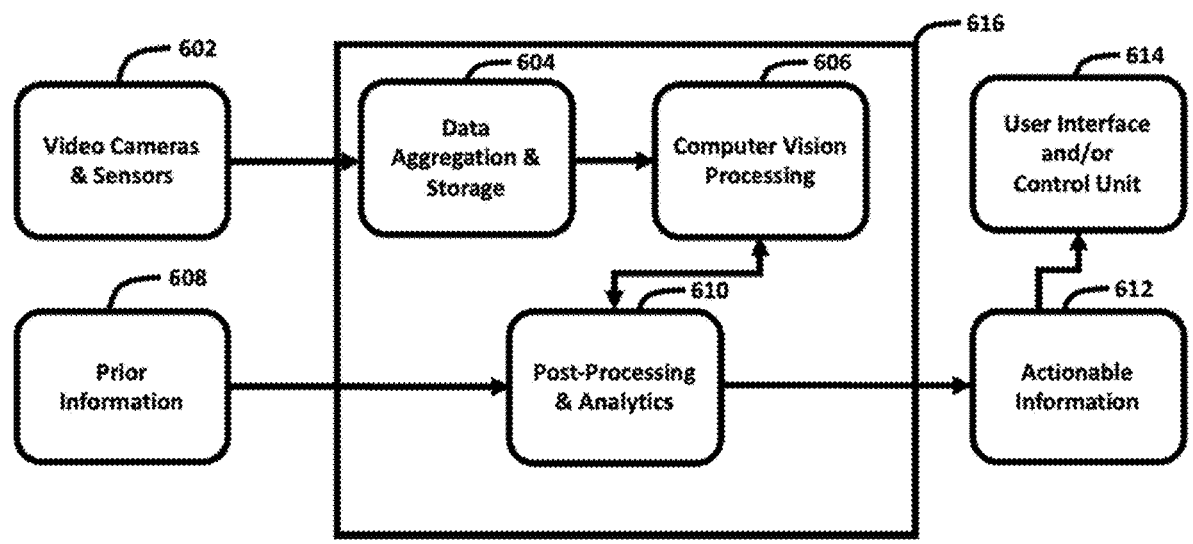
FIG. 7 depicts an embodiment of the system with the associated components and control flow. Video and sensor data, along with prior information is delivered to the processing unit to generate actionable information to be displayed in a user interface or delivered to a control unit.

FIG. 7 depicts an embodiment of the system with the associated components and control flow. Video and sensor data 602, along with prior information 608 is delivered to the processing unit 616 to generate actionable information 612 to be displayed in a user interface 614 or delivered to a control unit 614. According to FIG. 7, the system begins with video and sensor data at block 602 which will be processed in block 606 using CNNs in this embodiment to detect the presence or absence of human subject(s) in the area being monitored. Person detection algorithms (and more generally object detection algorithms) such as Retina-Net or Faster-RCNN operate by processing a frame of a video sequence (e.g. an image) and performing two tasks: detection of objects and classification of those objects. The algorithm can be trained on a set of representative images (e.g. images which contain the objects of interest, along with annotations of these objects within the images) so as to better recognize the desired target objects. Once it is trained, the detection algorithm will monitor the input video frames, and output bounding boxes and labels for the objects detected. This output can be processed in block 610 such as by counting the number of people detected in each room over a specified period of time to identify the occupancy status of each room in the facility. This information can be passed to a user and/or control unit in block 614 and used to assist in managing services and energy consumption in the area, such as lighting and heating, ventilating and air conditioning (HVAC).

For example, if the room is void of human subjects for a given period of time, it may be desirable to reduce the energy consumption in the room by reducing the lighting. Such an embodiment would be able to detect humans in the room whether or not there is motion present, but at the same time would be robust to confounding factors such as pets or other non-human movement.

According to FIG. 7, processing unit 616 also includes a module for data aggregation and storage 604 and post-processing and analytics module 610.

Figure 8:
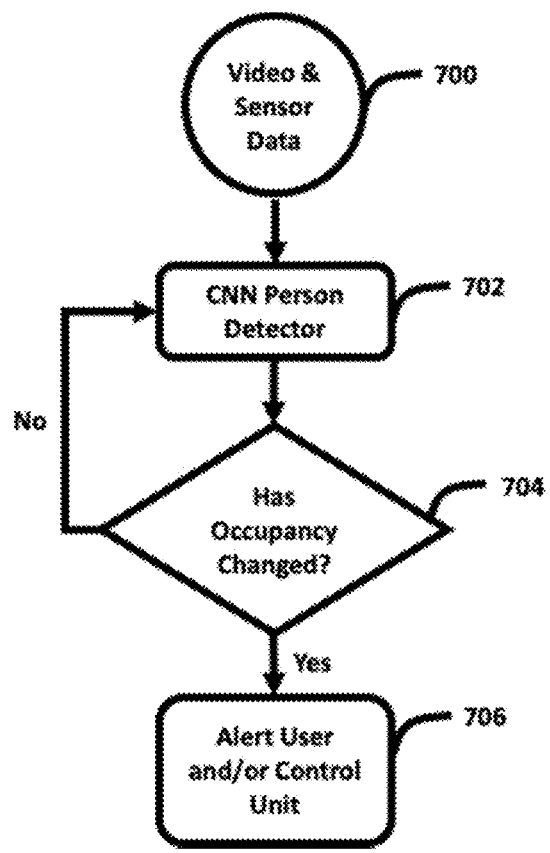
FIG. 8 depicts the logical flow for an embodiment of the system applied to autonomously detect the occupancy of a space to control systems such as lighting and HVAC. When the occupancy of a space chances, as detected by a CNN person detector, the system alerts a user and/or control unit.

FIG. 8 depicts the logical flow for an embodiment of the system applied to autonomously detect the occupancy of a space to control systems such as lighting and HVAC. As per FIG. 8, the system would be constantly monitoring video and sensor data from block 700, which would be interpreted by the CNN person detector in block 702. If the occupancy has changed, the state can be updated and relayed to either a user interface and/or a control unit capable of altering the state of the room (block 706). This capability would be a notable improvement over traditional motion detection solutions which can be easily fooled by the aforementioned cases. Outputs from the visual CNN networks could also be combined with other sensors such as optical sensors to improve the robustness as well as augment existing motion detection solutions.

Figure 9:
FIG. 9 depicts an example image of an embodiment of the system to autonomously detect people in a space, even if they are motionless. Traditional motion detectors would fail in this scenario, as the two individuals in the field of view are nearly motionless, however the CNN person detector identifies them with ease.

FIG. 9 depicts an example image of an embodiment of the system to autonomously detect people in a space, even if they are motionless. As seen in FIG. 9, the left Person and right Person can be detected by the system even if they are very still and/or motionless.

Figure 10:
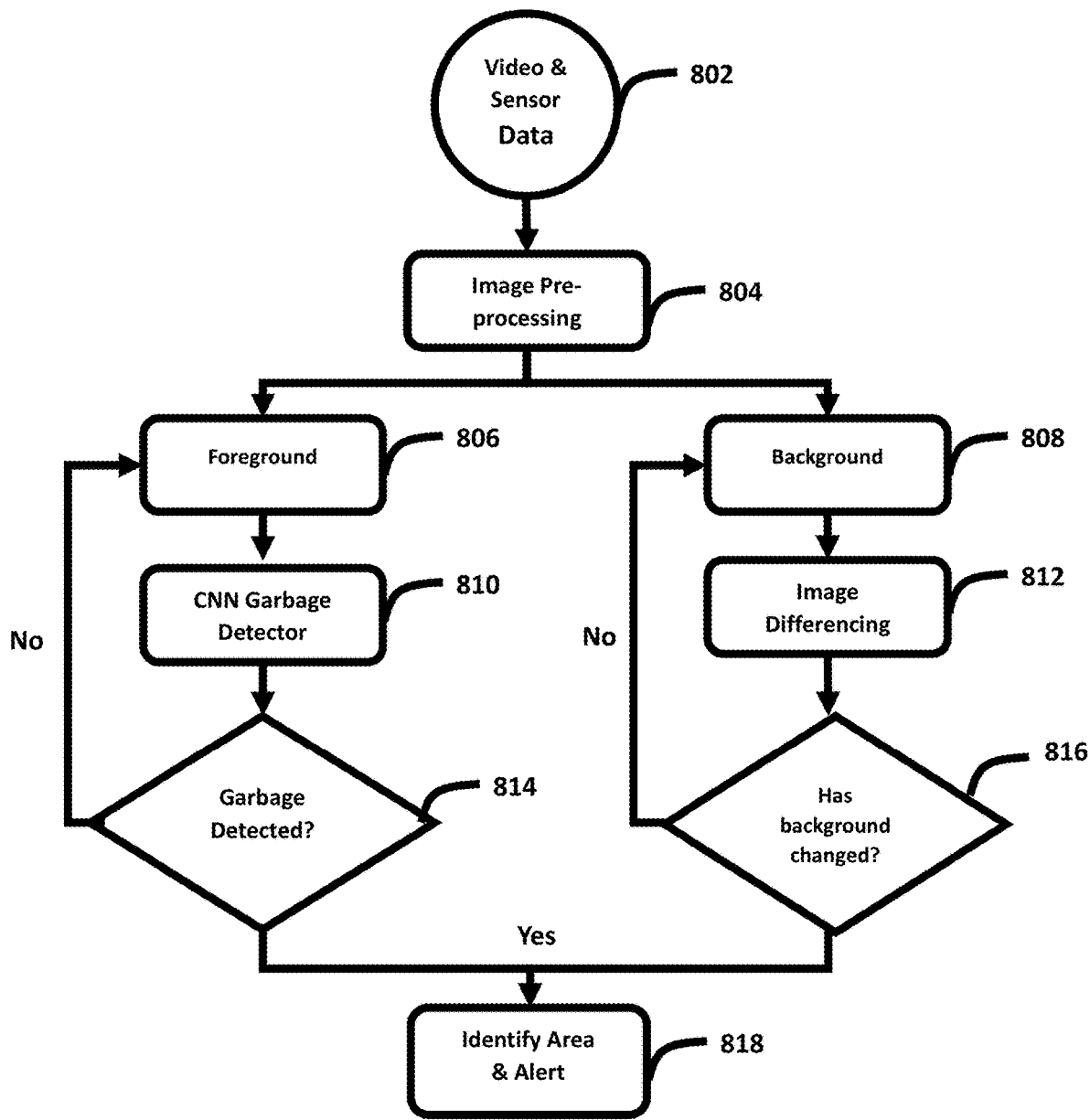
FIG. 10 depicts the control flow for an embodiment of the system to detect garbage and soiled areas in need of cleaning. It operates using a combination of deep learning models to detect anomalies in the foreground and the background, and then alerting the user of the areas in need of custodial attention.

FIG. 10 depicts the control flow for an embodiment of the system to detect garbage and soiled areas in need of cleaning. It operates using a combination of deep learning models to detect anomalies in the foreground and the background, and then alerting the user of the areas in need of custodial attention. As seen in FIG. 10, the system begins with video and/or sensor data at block 802, which will be processed in block 806 using CNNs to monitor the state of the space with respect to cleanliness. This may be a combination of different algorithms, one of which may be an object detection algorithm trained to identify garbage in the foreground (block 810).

Another algorithm may be an anomaly detection algorithm that would observe the imagery of the space and monitor for any differences in the background (block 812) such as objects which are not moving around (since this should eliminate most differences from transient people or objects moving through the scene). The current scene can be processed to focus on areas of interest and identify refuse or areas in need of cleaning (blocks 814 & 816). This information can be passed to a user interface (block 818) which may display rooms in which anomalies or garbage were detected, with the identified areas highlighted on the video imagery (see example in FIG. 11a and FIG. 11b).

Figure 11A:
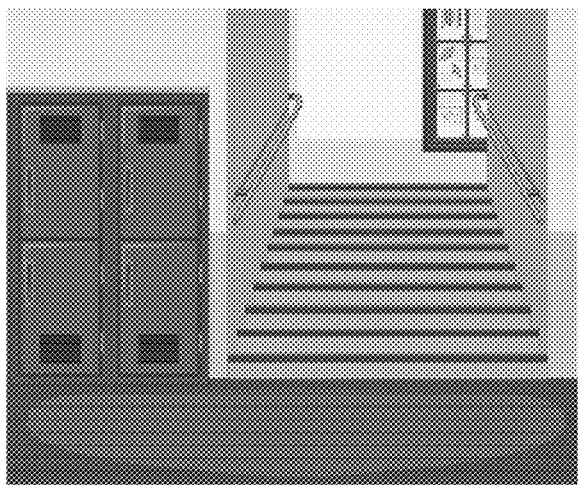
FIG. 11a shows the clean space as a reference.
Figure 11B:
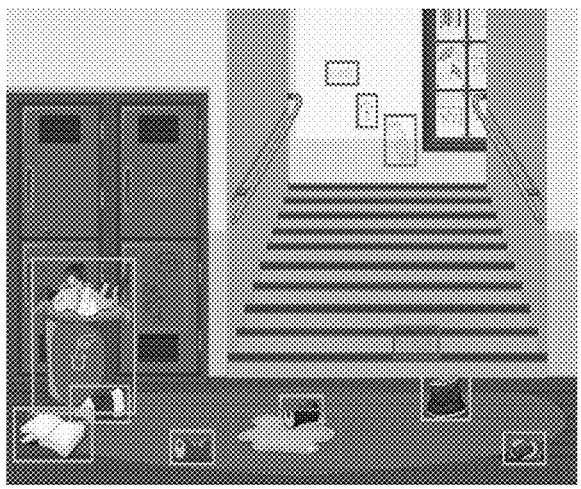
FIG. 11b depicts an example image of an embodiment of the system to autonomously detect garbage (identified by green bounding boxes) and soiled areas (identified by pink bounding boxes).

FIG. 11a shows the clean space as a reference. FIG. 11b depicts an example image of an embodiment of the system to autonomously detect garbage (identified by green bounding boxes) and soiled areas (identified by pink bounding boxes). This may assist custodial staff in prioritizing locations within the facility to tend to, which may result in more efficient and adaptive custodial practices, and in turn decreased resources necessary for the maintenance of the facility. It may also be desirable for the cleaning of identified areas to be performed autonomously by drone or by other robotic vehicles (e.g. Roomba robot vacuum cleaner).

Figure 12:
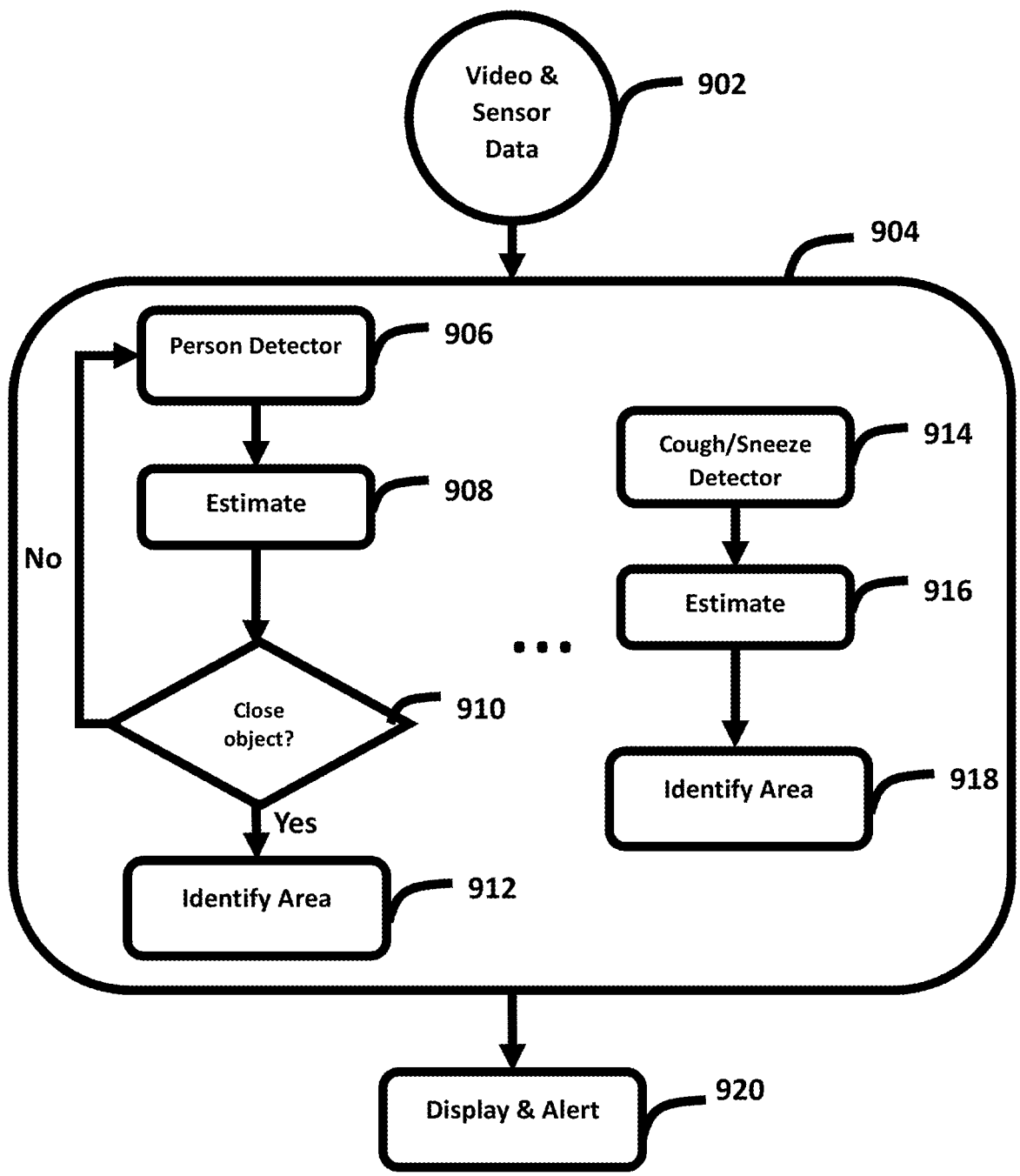
FIG. 12 depicts the control flow for an embodiment of the system to identify objects and surfaces at higher risk of contamination due to contact or proximity to an individual. The system may employ a number of different CNNs (two are shown in block 904) to detect different potential contamination events in a space, and to display alerts to assist staff to prioritize the sanitation of these areas.
Figure 13A:
FIG. 13 depicts example images of contamination events which would be desirable to detect autonomously.
Figure 13B:
Figure 13C:
Figure 13D:
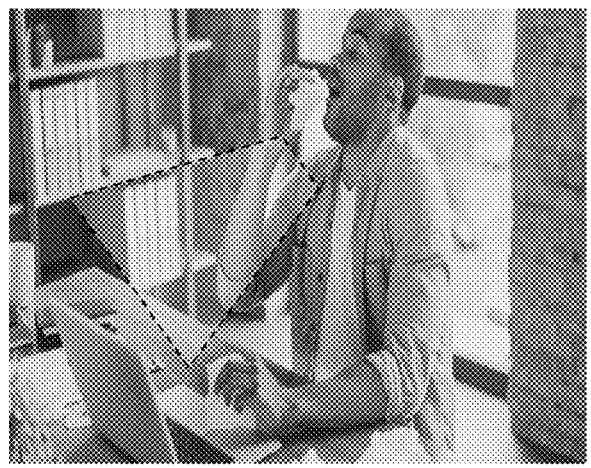

FIG. 12 depicts one other such embodiment of the system described herein. In this embodiment, the system begins with video and/or sensor data at block 902 which will be processed in block 904 using a number of different CNNs to monitor which surfaces and objects individuals touch or pass sufficiently close to contaminate with germs or other biological and or chemical contaminants. This may also be applied to track other interactions of individuals with objects and/or environments, such as, but not limited to, tracing of contaminants or allergens (e.g. identifying what objects and surfaces have been in proximity to peanuts in order to protect individuals at risk of anaphylaxis).

By tracking the movement of people in the video frames using a detection algorithm such as Yolov3 or Faster-RCNN (block 906) and analyzing their estimated distance (block 908) from various objects and/or surfaces within the field of view (e.g. counters, railings, elevator buttons), it may be possible to infer which objects and/or surfaces are at higher risk of contamination (block 910 and block 912). This may be done by computing the distance of the detected bounding box from pre-selected objects and/or surfaces in the field of view (block 908) and may employ multiple camera angles (e.g. stereo vision) to better estimate distances and locations.

Furthermore, it may be possible to not only detect contaminants based on physical contact, but also from violent expiratory events (e.g. coughing or sneezing) or other excretions of bodily fluids (both voluntary and involuntary) which could present an elevated risk of contaminating a large area (block 914). By using a technique to detect body motion which may be correlated with these events and creating a contamination vector in the direction of the detected expulsion, proportional in size to the strength of expulsion (as estimated using audio, video and/or other sensors in block 916), a contamination zone (corresponding to an estimated area of contamination) may be created and used in the determination of risk of contamination (block 918).

The accuracy and detectability of the system may be improved by altering the camera locations and perspectives to preferentially monitor high traffic or high-risk objects and/or surfaces (e.g. orient a camera to monitor in line across a counter so as to better measure the distance of a person from the counter). In block 920 these objects and surfaces may be identified in a user interface to alert the user that they may have been contacted, and therefore potentially contaminated. The alert may take the form of a colored overlay on the scene in which the color will identify how recently the objects and surfaces were contacted (e.g. surfaces which may have been recently contacted may display as a red overlay on the video, whereas surfaces which may have been contacted longer ago may display as a green overlay in the video as seen in FIG. 13.

FIG. 13 depicts example images of contamination events which would be desirable to detect autonomously. It would be desirable for the user to have the ability to adjust the maximum length of time these alerts will remain active throughout the scene, and to manually remove alerts from regions throughout the scene (e.g. After the contacted area has been disinfected, a user may remove the alert from this area). Removing alerts may be a manual process, or it may be automated, in which the system may detect custodial staff in the contaminated area using RFID sensors, IR identifiers in the video frame, or other methods to alert the system of their presence. It may also be desirable for the disinfecting to be operated autonomously by drone or by other robotic vehicles.

The alerts may assist staff to prioritize disinfecting surfaces and objects which have been contacted rather than to assume all surfaces are equally contaminated. This may result in less cross contamination of individuals via contact with surfaces and objects in shared spaces. This may also result in better management of resources and reducing risk in mitigating the spread of germs in facilities. It may also be possible to embed a detectable compound or feature in the cleaning fluid, such as a substance which is visible under certain optical sensors (e.g. UV light or IR imagery) so as to observe which surfaces have been disinfected with the fluid.

Figure 14:
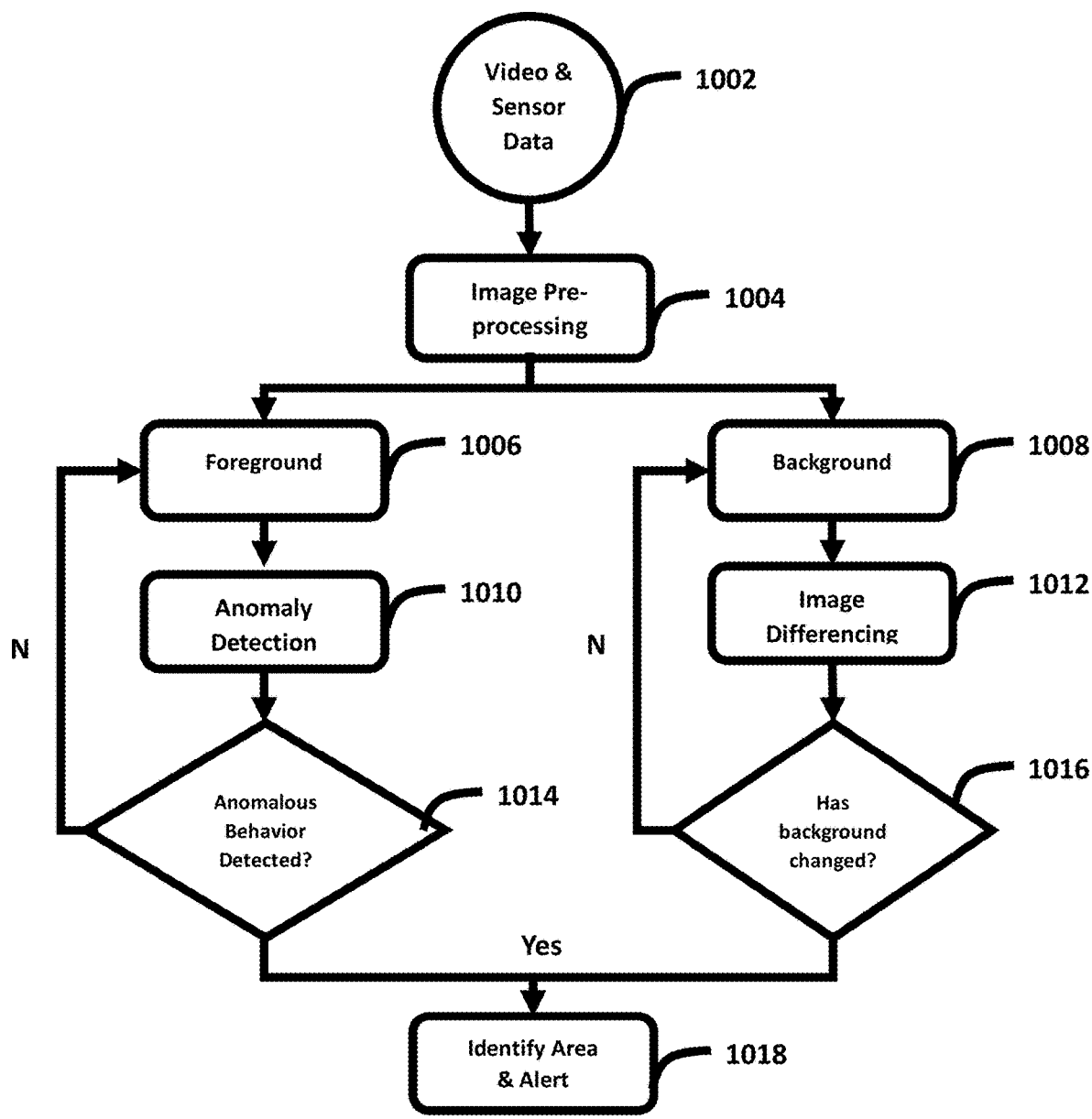
FIG. 14 depicts the control flow for an embodiment of the system to detect damage and anomalous behavior indicative of an event requiring maintenance. It operates using a combination of deep learning models to detect anomalies in the foreground and the background, and then alerting the user of the areas in need of custodial attention.

FIG. 14 depicts one other such embodiment of the system described herein. In this embodiment, the system begins with video and/or sensor data at block 1002 which will be processed in block 1004 using CNNs to monitor the state of the space with respect to maintenance and damaged property. This may be achieved using anomaly detection algorithms to identify areas of a video frame background which appear different (e.g. water dripping on the ground, graffiti on a wall); see block 1012. This may also be done using scene understanding algorithms (e.g. PSPNet) to identify anomalous behavior (block 1010) in an area suggestive of damage (e.g. a crowd of people forming, traffic moving differently).

If damage or anomalous behavior is detected, it will cause an alert in block 1018 which will notify maintenance staff that an event has occurred which may require attention. This may assist maintenance staff in logging and prioritizing events through-out the facility. The user will be able to update the ideal state to account for any alterations to the space (e.g. furniture is intentionally moved in the space, or signage is changed), be they temporary or permanent. The user will be able to remove alerts once proper action has been taken, and the user interface will log the event for future review.

Figure 15:
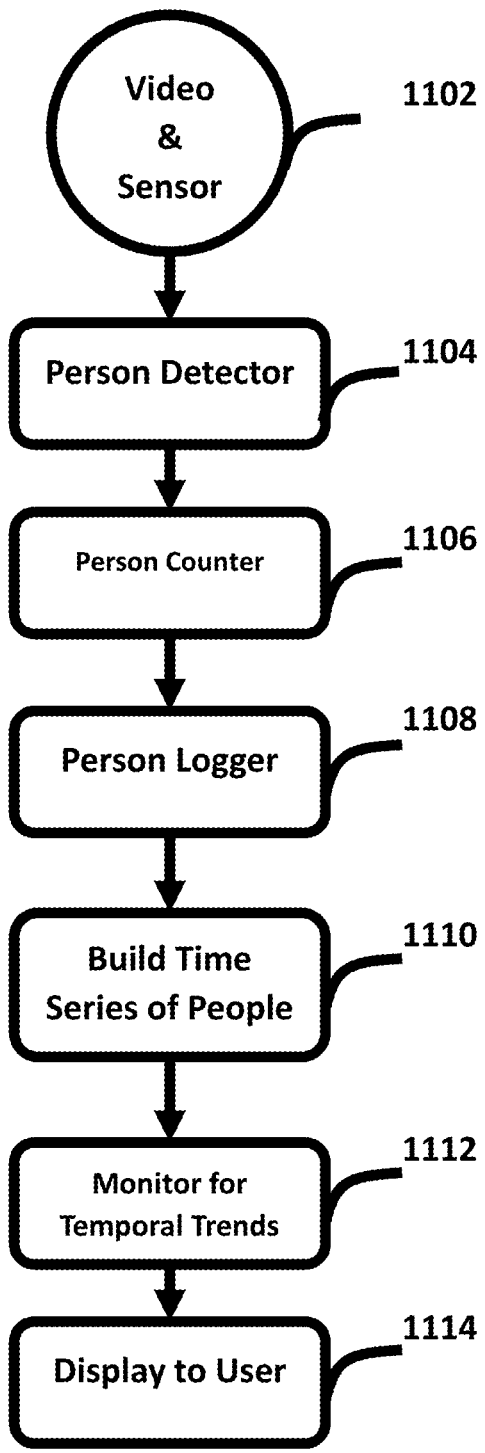
FIG. 15 depicts the control flow of an embodiment which monitors the distribution of people through a facility over time and uses machine learning to identify anomalous behavior, such as high traffic in the middle of the night.

FIG. 15 depicts one other such embodiment of the system described herein. In this embodiment, the system begins with video and/or sensor data at block 1102 which will be processed using CNNs to monitor the distribution of persons throughout the facility for security purposes. This may be done in block 1104 using a person detector algorithm (or more generally object detection algorithm) such as Retina-Net or Faster-RCNN. The output of the CNN may be a number of bounding boxes of detected objects, including people. The number of people objects can be counted in block 1106, and averaged over a pre-defined number of frames to obtain a reasonable estimate.

In block 1108 the number of people in each space can be logged at predefined time intervals, such as every 30 minutes. In block 1110 this data can be aggregated to a time series for each video camera. In block 1112 these time series can be analyzed using machine learning algorithms to monitor anomalous behavior through time, such as day-over-day. Information related to this can be displayed to security staff in block 1114 to assist them in patrolling the facility and optimizing their coverage of the grounds (e.g. It may be desirable to patrol areas which are higher traffic than areas which are empty, or to patrol an area during peak traffic times during the day or week). This may assist in deploying personnel and resources to priority zones throughout the facility in a more adaptive manner, resulting in a safer facility.

Figure 16:
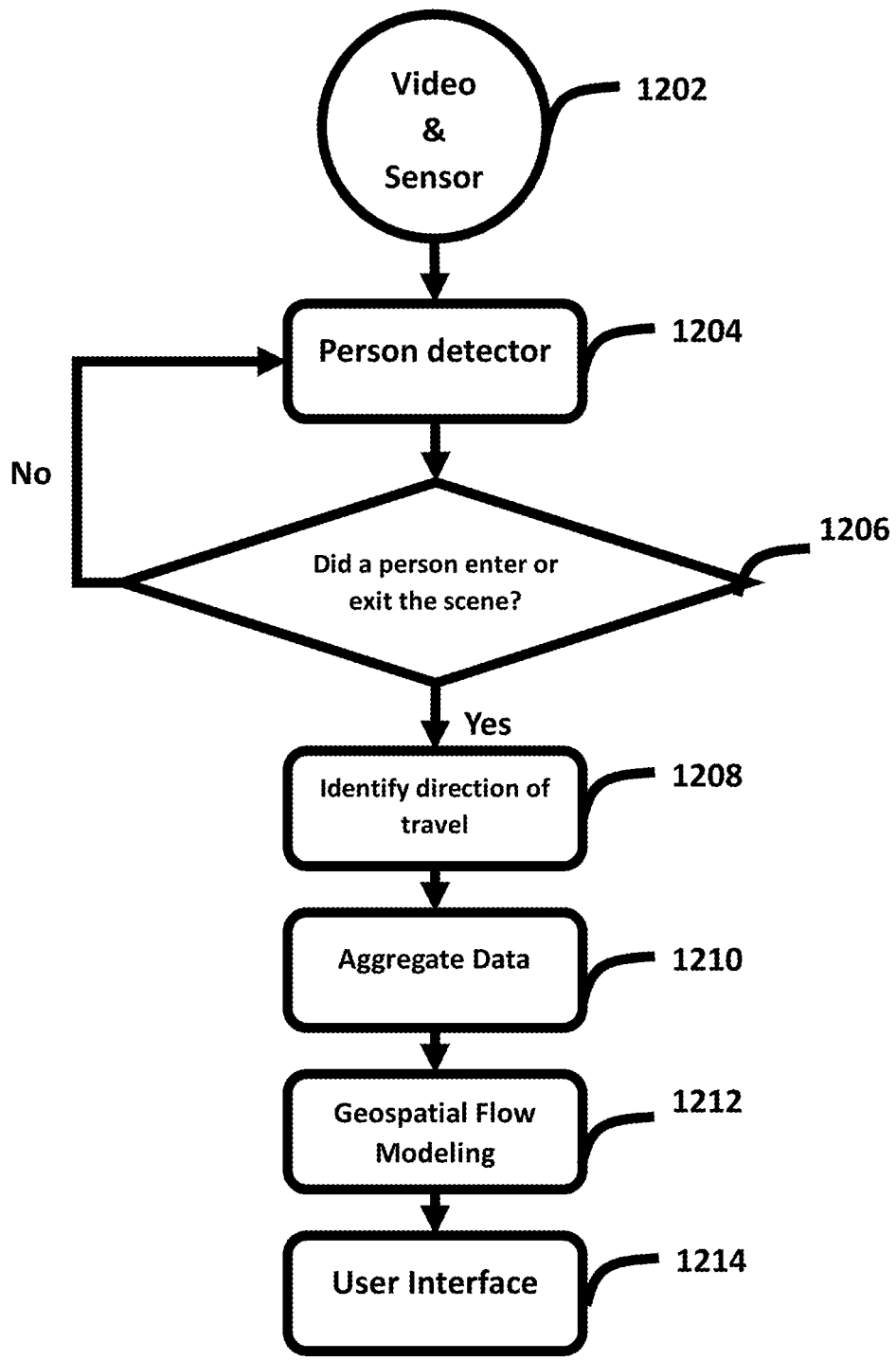
FIG. 16 depicts the control flow for an embodiment of the system which uses a CNN to identify people as they enter or exit the field of view and tracks their direction of travel. This information can be aggregated across many cameras and sensors to build an estimate for the flow path of people through a facility.

FIG. 16 depicts one other such embodiment of the system described herein. In this embodiment, the system begins with video and/or sensor data at block 1202 which will be processed using CNNs to monitor the displacement of people through-out the facility. In block 1206 the data from each video camera is analyzed to detect when a person enters or exits the field of view. This may be done using a person detector algorithm (or more generally object detection algorithm) such as RetinaNet or Faster-RCNN (in block 1204). If a person does enter or exit the field of view, their direction of travel is logged, such as from which side of the field of view they entered (block 1208). Information can be provided which geo-references the field of view for each camera so as to be able to build a common operating picture of the facility.

In block 1210 the data from people entering and exiting fields of view can be aggregated and applied to construct a rough estimate as to the flow of traffic within the facility over time (block 1212). In block 1214 this information is displayed in a user interface to provide anonymized, aggregated, actionable information about the movement of individuals throughout the facility (e.g. Which vendor stalls do most sports fans frequent in a stadium, or which stores do shoppers visit in a mall, or what days or times are higher traffic than others, or what path do people take to navigate a facility, or where would it make sense to include specific signage).

This embodiment may also be generalized to include information relating to other user behavior in a facility (e.g. a store may want to dynamically staff sales people in certain areas during high traffic days or times). This information may assist managers in the design or use of the space, to optimize the desired interaction with individuals within the facility. Another application may be to analyze flow rates and circulation patterns within a facility, to allow the creation of a facility layout which may minimize factors that decrease revenues, and maximize those which increase them.

In a further embodiment, disclosed herein is a sensor system for operation management. The sensor system comprises a plurality of inputs to receive data from one or more sensors an interface to access stored prior information and a processing unit. The processing unit further comprising data aggregation & storage module, computer vision processing module and post-processing & analytics module wherein the processing unit generates actionable information using stored prior information and input data.

One or more sensors of the sensor system is selected from a list consisting of video camera, optical camera, thermal camera, acoustic or sound pressure sensor, olfactory sensor, and motion sensor. Furthermore, the actionable information of the sensor system is sent to a user interface or a control unit.

According to a further embodiment, a computer implemented method using a control system is disclosed. The computer implemented method is used to detect garbage and soiled areas in need of cleaning. The method comprises receiving video & sensor data, pre-processing the received video and sensor data, detecting garbage in the foreground using a convolutional neural network (CNN) detector algorithm, detecting whether the background has changed using an anomaly detection algorithm and if garbage is detected or the background has changed, identify the area and provide an alert notification to user.

According to the disclosure, the anomaly detection algorithm monitors the imagery of the space for any differences in the background. The differences in the background include objects not moving to differentiate from transient people or objects moving through the scene. Furthermore, the step of detecting whether the background has changed uses an anomaly detection algorithm further comprises detecting damage or anomalous behavior indicative of an event requiring maintenance.

In a further embodiment, a further computer implemented method, using a control system is used to identify objects and surfaces at higher risk of contamination due to contact or proximity to an individual or an event. The method comprises receiving video & sensor data, detecting contamination event using two or more convolutional neural network (CNN) detector algorithms, identifying area of contamination and providing an alert notification to user. The computer implemented method utilizes multiple cameras and angles to better estimate distances and locations.

Furthermore, the event is a person detector that analyzes estimated distance from or between various objects within a field of view in order to infer which objects are at higher risk of contamination. The event can be an expulsion event. The expulsion event is selected from a list consisting of a cough, a sneeze and an excretion of bodily fluids.

In a further embodiment, the computer implemented method comprises a further step of detecting body motion and the step of creating a contamination vector in the direction of the detected expulsion event. The area of contamination is created to determine the risk of contamination.

In a further embodiment, a computer implemented method, using a control system, is used to determine control flow of people in a facility. The method comprises receiving video and sensor data, monitoring the distribution of people throughout the facility using convolutional neural network (CNN) detector algorithms, counting the number of people, logging the number of people at predetermined time intervals, building a time series of people for each video camera, monitoring for temporal trends and displaying information to the user. The step of monitoring for temporal trends further comprises monitoring anomalous behavior over time. The predetermined time interval is selected from a list including 5 minutes, 10 minutes, 30 minutes, 60 minutes, 2 hours, 24 hours and 48 hours.

In a further embodiment, a computer implemented method using a control system to determine the flow of people in a facility is disclosed. The method comprises receiving video & sensor data, analyzing video camera feeds to detect when a person enters or exits the field of view using a person detector algorithm, identifying the direction of travel, aggregating flow of people data to construct an estimate of the flow of people within the facility over time and outputting data to a user interface.

In a further embodiment, a computer implemented method using a control system to autonomously detect occupancy of a space to activate sensor controls is disclosed. The method comprises receiving video and sensor data, receiving data from a convolutional neural network (CNN) detector, determining that occupancy of a space has changed based on data provided by the CNN detector and providing alert notification to user and/or control unit.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claim is:

1. A computer implemented method, using a control system, to identify objects and surfaces at higher risk of contamination due to contact or proximity to an individual or an event, the method comprising:
   receiving video & sensor data;
   detecting a contamination event using two or more convolutional neural network (CNN) detector algorithms;
   detecting body motion;
   creating a contamination vector in the direction of the detected contamination event proportional in size to the strength of expulsion;
   identifying area of contamination using the body motion and the contamination vector; and
   providing alert notification to user;
   wherein the contamination event is a violent expulsion event of bodily fluids or a violent expiratory event;
   wherein the area of contamination is configured to determine the risk of contamination.

2. The method of claim 1 wherein the event is a person detector that analyzes estimated distance from or between various objects within a field of view in order to infer which objects are at higher risk of contamination.

3. The method of claim 1 further comprising using multiple cameras and angles to better estimate distances and locations.

4. The method of claim 1 wherein the area of contamination is created to determine the risk of contamination.

5. The method of claim 1 wherein the expulsion event is selected from a list consisting of a cough, a sneeze and an excretion of bodily fluids.

6. The method of claim 5 wherein the excretion of bodily fluids is selected from a list consisting of saliva, phlegm or blood.

* * * * *